May 22, 1956 J. L. GIBSON 2,746,261
REFRIGERATING APPARATUS
Filed Oct. 26, 1953
*Fig. 1*
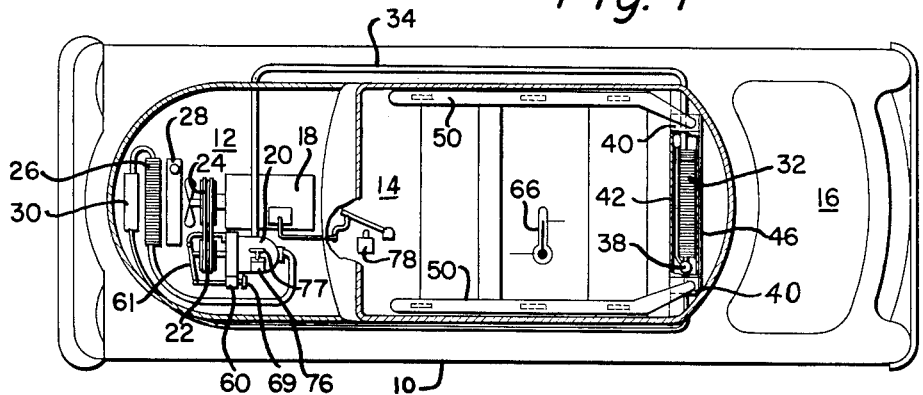
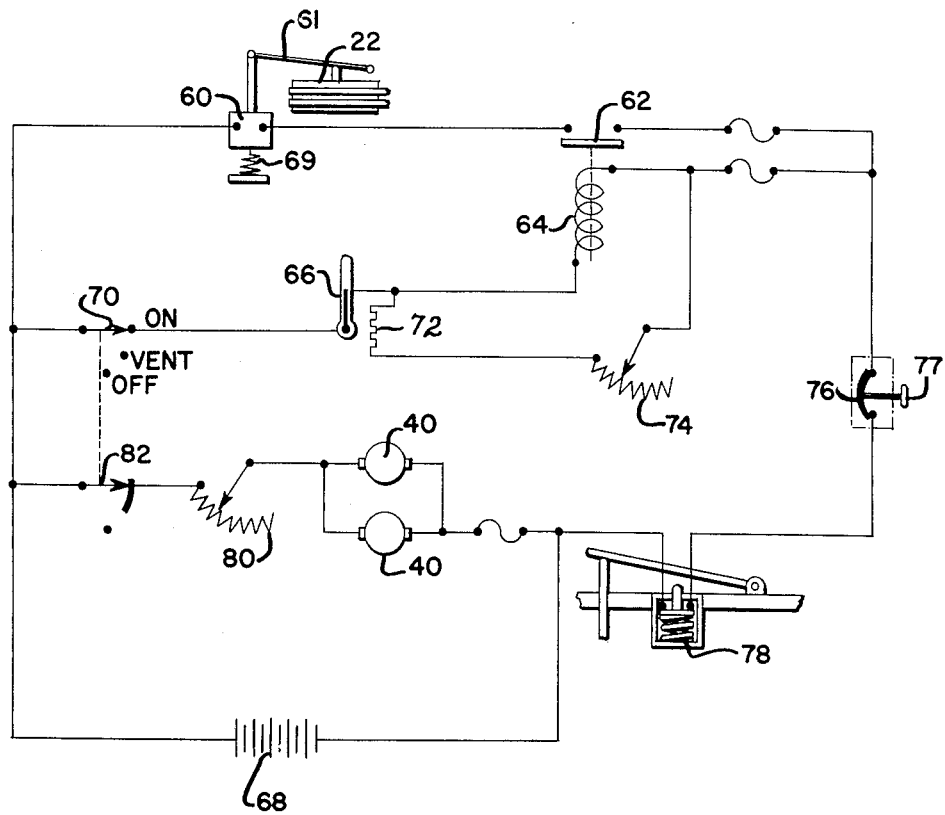
*Fig. 2*
INVENTOR.
J Lowell Gibson
BY R. R. Candor
His Attorney.

ated May 22, 1956

United States Patent Office 2,746,261

2,746,261

REFRIGERATING APPARATUS

J. Lowell Gibson, Dayton, Ohio, assignor to General Motors Corporation, Detroit, Mich., a corporation of Delaware Application October 26, 1953, Serial No. 388,341

6 Claims. (Cl. 62—4)

This invention relates to refrigerating apparatus and more particularly to an automobile air conditioning system.

Refrigeration systems used for air conditioning automobiles are subjected to considerable vibration and shock with the result that leaks sometimes develop and allow the refrigerant and lubricant to leak out of the system. The loss of lubricant soon causes heating of the compressor and unless the compressor is stopped it will become damaged.

It is an object of this invention to provide a control for the refrigerant compressor which provides maximum protection against compressor damage in the event of overheating of the compressor from any cause whatsoever.

More specifically it is an object of this invention to provide an automobile air conditioning system in which a clutch is provided between the main car engine and the compressor and in which a solenoid disengages the clutch in response to a predetermined increase in the compressor temperature.

Another object of this invention is to provide an automobile air conditioning system in which means are provided for disengaging the clutch whenever it is desired to utilize the maximum power output of the car engine for driving the car.

More particularly it is an object of this invention to provide means for disengaging the clutch between the car engine and the compressor when the accelerator pedal is pushed to the floor.

Another object of this invention is to provide a simple control circuit in which several controls responding to different conditions may be used for controlling the operation of the compressor.

Further objects and advantages of the present invention will be apparent from the following description, reference being had to the accompanying drawings wherein a preferred form of the invention is clearly shown.

In the drawings:

Figure 1 is a schematic plan view with parts broken away showing the invention applied to a conventional automobile; and, Figure 2 is a schematic view showing the electrical system used in controlling the air conditioning equipment.

Referring now to the drawing wherein a preferred embodiment of the invention has been shown, reference numeral 10 generally designates a conventional passenger automobile having an engine compartment 12, a passenger compartment 14 and a luggage compartment 16. Reference numeral 18 designates the main engine which is used for propelling the car and for driving the usual auxiliary equipment including a refrigerant compressor 20. A clutch mechanism 22 and belts 24 are provided for transmitting power from the engine 18 to the compressor 20. A solenoid 60 mounted upon the compressor 20 is provided for operating the clutch 22.

The compressor 20 forms a part of a volatile refrigerant air conditioning system which includes a condenser 26 mounted in front of the main engine radiator 28, a receiver 30, an evaporator 32, and refrigerant flow connections 34 which connect the compressor, condenser, receiver, and evaporator in a closed series refrigerant flow circuit.

For purposes of illustration a conventional thermostatic expansion valve 38 has been shown for controlling the flow of high pressure liquid refrigerant into the evaporator 32 whereas any suitable type of control could be used. A pair of blowers 40 are provided for circulating the air to be conditioned within the passenger compartment. Provision is made for returning air from the passenger compartment to the evaporator through a return air opening 42 which for purposes of illustration has been shown located directly behind the rear seat of the passenger compartment of the car.

In the embodiment shown, the conditioned air leaves the fan units through air distributing ducts 50 located adjacent the upper sides of the passenger compartment in accordance with present air conditioning practice. Insofar as certain aspects of the invention are concerned the construction and location of the evaporator 32, blowers 40, and air ducts 50 may be varied without departing from the spirit of the invention.

The clutch operating solenoid 60 is arranged in an electric circuit in the manner illustrated in Figure 2 of the drawing so as to be controlled by a switch 62 which in turn is controlled by the solenoid 64 arranged in series circuit relationship with the thermostat 66 whereby the compressor operation is normally controlled by the thermostat 66. A spring 69 biases the solenoid 60 into declutching position so that when no current flows to the solenoid 60 the compressor does not operate.

The usual car battery 68 is used for supplying electrical energy to the various controls as shown. The arrangement is such that when the air conditioning switch 70 is moved to its on position so as to connect the thermostat 66 in series with the battery 68, the solenoid 64 will be controlled by the thermostat 66 in such a manner that at high car temperatures the circuit to the solenoid 64 will be closed. Energization of the solenoid 64 causes engagement of the clutch which then results in operation of the compressor.

For purposes of illustration, the thermostat 66 has been shown mounted in the passenger compartment of the car whereas it could be mounted in the return air duct or in any other suitable location where it would be responsive to air conditioning requirements. The thermostat includes a small heater coil 72 which is arranged in series with a manually operable rheostat 74 so as to make it possible to adjust the temperature at which the thermostat 66 will close the circuit. Insofar as certain aspects of the invention are concerned, the thermostat could control the flow of refrigerant to the evaporator in other ways then that shown.

If for any reason the compressor should become overheated, it should be declutched from the car engine so as to prevent damage to the compressor. For this purpose a thermostatic switch 76 has been mounted directly on the compressor housing in a manner to respond to the temperature of the compressor. This thermostatic switch 76 is arranged in the circuit as shown and is adapted to open the circuit to the solenoid 64 as well as to the solenoid 60 so as to thereby stop operation of the compressor. The switch 76 is of the well known type having a manual reset button on knob 77 whereby the compressor will not restart after it has been cooled by the surrounding air without the operator resetting the button 77. Since the thermostat does not stop the car engine this is an important feature. Patent No. 1,987,662 shows one type of manually reset thermostat which could be used.

There are times when the maximum output of the car engine may momentarily be desired for propelling the car and consequently means have been provided for automatically disengaging the clutch under such conditions. This latter means comprises a throttle operated switch 78 for opening the circuit to the clutch operating solenoid when the accelerator pedal has been moved to the full open throttle position such as when passing another car or the like. The exact means for opening the circuit to the clutch operated solenoid when all available power is desired for propelling the car may take any of several forms without departing from the spirit of my invention.

The blower motors are preferably of the variable speed type and are arranged in circuit with a speed controlling rheostat 80 and a manual control switch 82. The manual control switch 82 is connected with the manual control switch 70 so that when the switch is moved to the on position or the ventilating position the blowers 40 will be caused to operate. In order to discontinue the operation of the blowers it is necessary to move the switches 70 and 82 to the off position. The controls for the rheostat 80 and the switches 70 and 82 are preferably located on the dashboard of the car.

While the form of embodiment of the invention as herein disclosed constitutes a preferred form, it is to be understood that other forms might be adopted as may come within the scope of the claims which follow.

What is claimed is as follows:

1. In combination with a car having a passenger compartment and an engine compartment, an engine within said engine compartment, a compressor, torque transmittig means including a clutch between said engine and said compressor, a condenser, a refrigerant evaporator, means for circulating air to be conditioned for said passenger compartment in thermal exchange with said evaporator, refrigerant flow connections between said compressor, condenser and evaporator, and means responsive to a predetermined increase in the temperature of said compressor for disengaging said clutch, said last named means comprising a manually resettable thermostat mounted on said compressor.

2. In combination with a car having a passenger compartment and an engine compartment, an engine within said engine compartment, a compressor, torque transmitting means including a clutch between said engine and said compressor, a condenser, a refrigerant evaporator, means for circulating air to be conditioned for said passenger compartment in thermal exchange with said evaporator, refrigerant flow connections between said compressor, condenser, and evaporator, and means responsive to a predetermined increase in the temperature of said compressor for disengaging said clutch.

3. In combination with a car having a passenger compartment and an engine compartment, an engine within said engine compartment, a compressor, torque transmitting means including a clutch between said engine and said compressor, a solenoid for operating said clutch, a refrigerant evaporator, means for circulating air to be conditioned for said passenger compartment in thermal exchange with said evaporator, a condenser, refrigerant flow connections between said compressor, condenser, and evaporator, a control circuit for said clutch operating solenoid, first switch means in said circuit responsive to refrigeration requirements in said passenger compartment for controlling the energization of said solenoid, and second means in said circuit responsive to a predetermined high temperature of said compressor for disengaging said clutch.

4. In combination with a car having a passenger compartment and an engine compartment, an engine within said engine compartment, a compressor, torque transmitting means including a clutch between said engine and said compressor, a condenser, a refrigerant evaporator, means for circulating air to be conditioned for said passenger compartment in thermal exchange with said evaporator, refrigerant flow connections between said compressor, condenser, and evaporator, means responsive to refrigeration requirements in said passenger compartment for controlling the supply of refrigerant to said evaporator, and means responsive to the temperature of said compressor for disengaging said clutch at compressor temperatures above a predetermined value.

5. In combination with a car having a passenger compartment and an engine compartment, an engine within said engine compartment, a compressor, torque transmitting means between said engine and said compressor including a clutch, a condenser, a refrigerant evaporator, means for circulating air to be conditioned for said passenger compartment in thermal exchange with said evaporator, refrigerant flow connections between said compressor, condenser, and evaporator, first means responsive to refrigeration requirements in said passenger compartment for controlling the operation of said clutch, second means responsive to the temperature of said compressor for controlling said clutch, and third means responsive to a predetermined power demand on said engine for controlling said clutch so as to disengage said compressor from said engine during peak power demands.

6. In combination with a car having a passenger compartment and an engine compartment, an engine within said engine compartment, a compressor, torque transmitting means including a clutch between said engine and said compressor, a solenoid for operating said clutch, a source of electric energy, a circuit connecting said solenoid to said source of electric energy and having a plurality of switch means therein, a condenser, a refrigerant evaporator, means for circulating air to be conditioned for said passenger compartment in thermal exchange with said evaporator, refrigerant flow connections between said compressor, condenser, and evaporator, means responsive to a predetermined increase in the temperature of said compressor for operating one of said switch means so as to disengage said clutch, and means responsive to a predetermined demand on said engine for operating another of said switch means so as to disengage said clutch.

References Cited in the file of this patent

UNITED STATES PATENTS

| | | |
|---|---|---|
| 1,987,662 | Blatz | Jan. 15, 1935 |
| 2,188,350 | Holmes | Jan. 30, 1940 |
| 2,264,821 | Zukoski | Dec. 2, 1941 |
| 2,271,415 | Conlon | Jan. 27, 1942 |
| 2,281,244 | Milar | Apr. 28, 1942 |
| 2,344,864 | Griswold | Mar. 21, 1944 |
| 2,518,316 | Henney | Aug. 8, 1950 |
| 2,614,396 | Ratermann | Oct. 21, 1952 |
| 2,663,199 | Harrison | Dec. 23, 1953 |